(12) United States Patent
Andreotti

(10) Patent No.: US 6,679,058 B1
(45) Date of Patent: Jan. 20, 2004

(54) GAS HYDRO ELECTRIC MOTOR

(76) Inventor: Daniel Andreotti, 1101 W. Fairfield Ct., Glendale, WI (US) 53217

( * ) Notice: Subject to any disclaimer, the term of this patent is extended or adjusted under 35 U.S.C. 154(b) by 0 days.

(21) Appl. No.: 10/295,444

(22) Filed: Nov. 15, 2002

Related U.S. Application Data

(60) Provisional application No. 60/346,816, filed on Jan. 10, 2002.

(51) Int. Cl.[7] .................. F16D 31/02; B60K 6/02; F02B 73/00
(52) U.S. Cl. ................... 60/698; 60/716; 180/65.4; 180/305
(58) Field of Search ............... 60/698, 716; 180/65.4, 180/305

(56) References Cited

U.S. PATENT DOCUMENTS

| | | | |
|---|---|---|---|
| 4,042,056 A | 8/1977 | Horwinski | |
| 4,180,138 A | 12/1979 | Shea | |
| 5,327,987 A | 7/1994 | Abdelmalek | |
| 6,311,487 B1 | * 11/2001 | Ferch | ............ 180/305 |
| 6,481,516 B1 | * 11/2002 | Field et al. | ............ 180/65.4 |

* cited by examiner

Primary Examiner—Sheldon J. Richter
(74) Attorney, Agent, or Firm—Matthew J. Peirce

(57) ABSTRACT

A new and improved mechanical system that would replace the motor of any existing vehicle currently in production is disclosed. The present invention uses a combination of a small gas motor, a few small electric motors, and hydraulics to provide the workable engine.

4 Claims, 1 Drawing Sheet

GAS HYDRO ELECTRIC MOTOR

Figure 1:
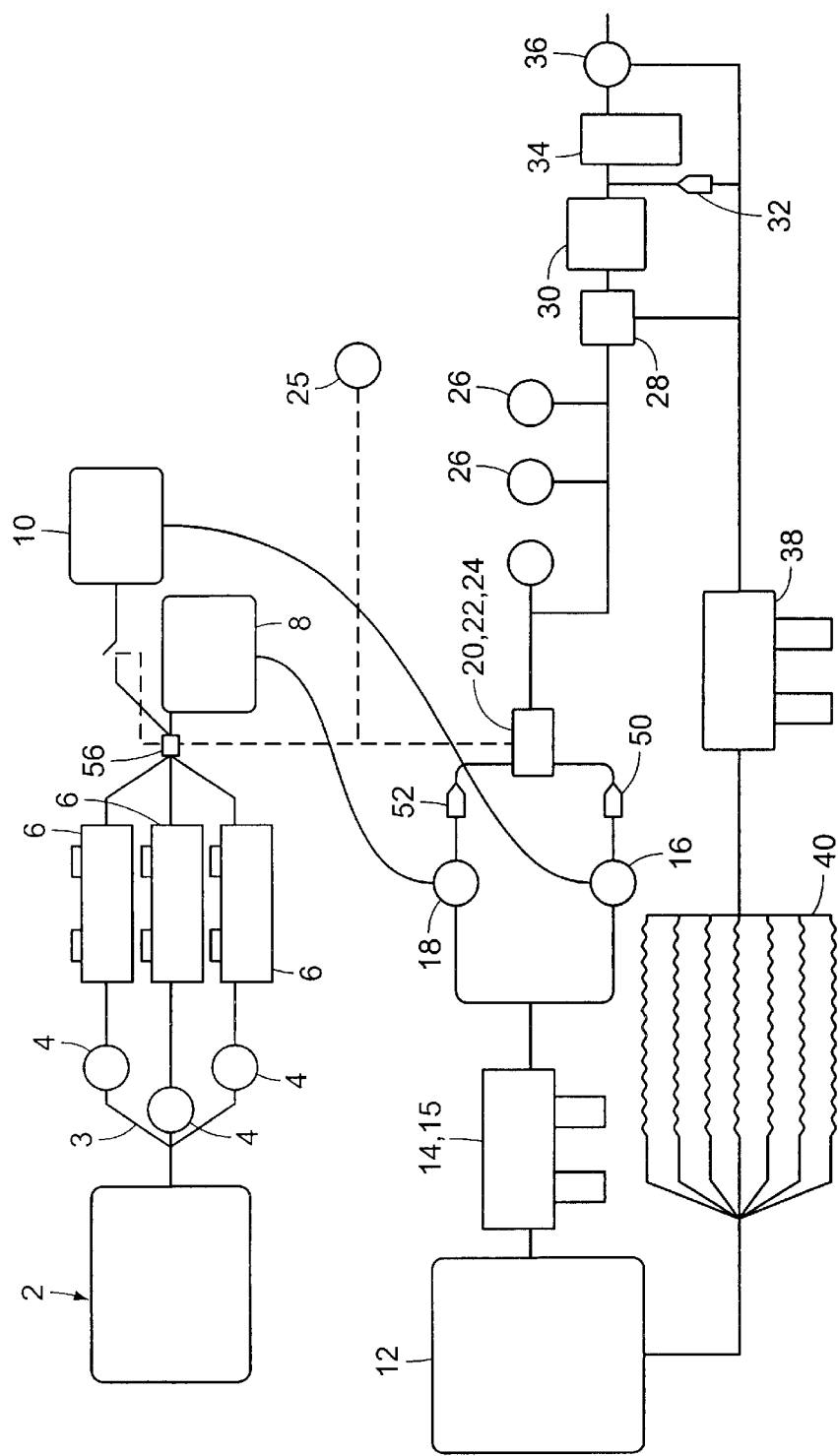

This application claims the benefit of Provisional Application Ser. No. 60/346,816 filed Jan. 10, 2002.

I. BACKGROUND OF THE INVENTION

The present invention concerns that of a new and improved motor that would replace the motor of any existing vehicle currently in production.

II. DESCRIPTION OF THE PRIOR ART

U.S. Pat. No. 5,327,987, issued to Abdelmalek, discloses a hybrid vehicle propulsion system comprised of an internal combustion engine capable of absorbing excess heat to drive an electric generator for use with an electric motor.

U.S. Pat. No. 4,180,138, issued to Shea, discloses a vehicle with a primary gasoline engine for driving a second electric or hydraulic pump motor.

U.S. Pat. No. 4,042,056, issued to Horwinski, discloses a hybrid powered vehicle using both a gasoline and battery powered source of energy.

III. SUMMARY OF THE INVENTION

The present invention concerns that of a new and improved mechanical system that would replace the motor of any existing vehicle currently in production. The present invention uses a combination of a small gas motor, a few small electric motors, and hydraulics to provide the workable engine.

There has thus been outlined, rather broadly, the more important features of a vehicle motor so that the detailed description thereof that follows may be better understood and in order that the present contribution to the art may be better appreciated. There are, of course, additional features of a vehicle motor that will be described hereinafter and which will form the subject matter of the claims appended hereto.

In this respect, before explaining at least one embodiment of the vehicle motor in detail, it is to be understood that the vehicle motor is not limited in its application to the details of construction and to the arrangements of the components set forth in the following description or illustrated in the drawings. The vehicle motor is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present vehicle motor. It is important, therefore, that the claims be regarded as including such equivalent constructions insofar as they do not depart from the spirit and scope of the present invention.

It is therefore an object of the present invention to provide a vehicle motor which has all of the advantages of the prior art and none of the disadvantages.

It is another object of the present invention to provide a vehicle motor which may be easily and efficiently manufactured and marketed.

It is another object of the present invention to provide a vehicle motor which is of durable and reliable construction.

It is yet another object of the present invention to provide a vehicle motor which is economically affordable and available for the relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 1 shows a perspective representation of the present invention.

V. DESCRIPTION OF THE PREFERRED EMBODIMENT

Priority is hereby claimed to application 60/346,816, filed on Jan. 10, 2002.

FIG. 1 shows a perspective representation of the present invention. Gas motor 2 would drive a belt 3 that would connect to a plurality of alternators 4. Preferably, three alternators 4 would be used, but the number, could be greater or less than three, depending on the needs of a particular vehicle. The alternators 4 would generate electricity, which would be stored within a plurality of batteries 6.

Main electric motor 8 and auxiliary electric motor 10 get their power from batteries 6. Auxiliary electric motor 10, however, is only powered when the pressure in the hydraulic system drops below a certain pre-determined pressure.

Main hydraulic pump 16 is connected to main electric motor 8, while auxiliary hydraulic pump 18 is connected to auxiliary electric motor 10. Each respective pump would only be in operation if and when their respective motor would be in operation.

Hydraulic reservoir 12 stores hydraulic fluid that is used with the present invention. Connected to reservoir 12 is manifold 14 which includes an internal filter 15 that will keep any contaminates from flowing down the supply line to the pumps 16 and 18.

Manifold 20 is a second manifold which is connected to the hydraulic lines after the hydraulic pumps 16 and 18. This manifold 20 has an internal low pressure switch 22, which is connected to auxiliary electric motor 10. Upon a drop in system pressure caused by increased demand on the system, the low pressure switch 22 becomes a closed switch, thereby turning on auxiliary hydraulic motor 10, which subsequently runs auxiliary hydraulic pump 18. Once auxiliary hydraulic pump 18 is in operation, it will add fluid volume and pressure to the system. Once pressure and fluid volume is restored to the system, low pressure switch 22 would be opened, cutting off power to the auxiliary hydraulic motor 10, thereby shutting off the auxiliary hydraulic pump 18.

Manifold 20 also includes pressure transmitter 24, which is connected to pressure gauge 25. Pressure gauge 25 is mounted in an area within a vehicle that could easily be read by an operator of the vehicle and would inform the operator of the system pressure.

Located in between the pumps 16 and 18 and manifold 20 would be check valves 50 and 52. Valve 50 would be located in between pump 16 and manifold 20, while valve 52 would be located in between pump 18 and manifold 20. Check valves 50 and 52 would be designed to prevent fluid from one pump from "backfeeding" into the other pump.

The present invention also includes a plurality of accumulators 26 that would store hydraulic pressure and would help dampen surges in the system. Overpressure relief valve 28 is designed to be a safety valve in case there would be a build-up of pressure over normal operating pressure. Valve 28 would open and release pressure into the return lines if pressure did become too great, and would remain open until pressure is restored to a normal range.

Pressure control valve 30 controls the amount of fluid that is sent to the servo motor 36. The more fluid that is let through the faster the motor 36 spins, and the faster the vehicle travels. The valve 30 would be linked to the accelerator pedal (gas pedal) within a vehicle. The servo motor 36 hooks directly up to the transmission turning the gears inside to drive the vehicle to which the present invention would be attached.

Check valve 32 is present so that when control valve 30 is closed or the hydraulic fluid flow is reduced, the servo motor 36, which would still be turning from the gears in the transmission, would be acting like a pump. In this case, the servo motor 36 would be drawing fluid from the return line into the motor 36, keeping the motor 36 spinning freely, which would allow the vehicle to coast. The valve 32 also keeps fluid from flowing from the pressure side to the return side.

Filter 34 would be placed in the system immediately before the servo motor 36, providing the system with yet another filter that would ensure no impurities get into the servo motor 36.

Upon the return trip to the hydraulic reservoir 12, the system would have at least one return line filter 38 before traveling through the radiator 40 to cool down. Then, the fluid would return to the hydraulic reservoir 12.

The present invention also includes relay 56, which is installed between the plurality of batteries 6 and the main and auxiliary motors. Relay 56 would shut off power in the present invention when the vehicle is shut off.

What I claim as my invention is:

1. A vehicle engine in combination with a vehicle, the vehicle including a transmission and an accelerator pedal, the vehicle engine comprising:
   (a) a gas motor,
   (b) a plurality of alternators,
   (c) a belt connecting the gas motor to the each of the alternators of the plurality of alternators,
   (d) a plurality of batteries electronically connected to the plurality of alternators, the plurality of batteries being rechargeable, the plurality of batteries designed to receive and store power generated by the plurality of alternators,
   (e) a pair of motors comprising a main electric motor and an auxiliary electric motor, each of the motors being electronically connected to the plurality of batteries,
   (f) a pair of hydraulic pumps comprising a main hydraulic pump and an auxiliary hydraulic pump, the main hydraulic pump being connected to the main electric motor, the auxiliary hydraulic pump being connected to the auxiliary electric motor,
   (g) a hydraulic reservoir,
   (h) a volume of hydraulic fluid within the hydraulic reservoir,
   (i) a first manifold, the manifold connected to the hydraulic reservoir by a hydraulic line, the manifold including an internal filter to remove contaminants within the volume of hydraulic fluid,
   (j) a second manifold, the second manifold connected to the first manifold by a hydraulic line
   (k) a low-pressure switch located within the second manifold, the low-pressure switch having two positions, an open position and a closed position, the low-pressure switch connected to the auxiliary electric motor, the low-pressure switch being in an open position when the hydraulic pressure within the present invention is high, the low-pressure switch being in a closed position when the hydraulic pressure within the present invention is low, thereby providing power to the auxiliary hydraulic pump,
   (l) a pressure gauge mounted within the vehicle in a location capable of being viewed by a driver,
   (m) a pressure transmitter located within the second manifold, the pressure transmitter connected to the pressure gauge, the pressure transmitter capable of measuring the hydraulic pressure within the
   (n) means for preventing hydraulic fluid from backtracking into the pair of hydraulic pumps,
   (o) means for maintaining a proper hydraulic pressure within the present invention,
   (p) a servo motor connected to the transmission within the vehicle, the servo motor also connected to the accelerator pedal within the vehicle, the servo motor being designed to control the pace of the transmission of the vehicle,
   (q) a pressure control valve connected to the second manifold via a hydraulic line, the pressure control valve also connected to the servo motor via a hydraulic line, the pressure control valve being designed to control the amount of hydraulic fluid that is sent to the servo motor,
   (r) a check valve designed to allow hydraulic fluid to pass through the return line when the control valve is closed or the hydraulic fluid flow is reduced, allowing the vehicle to coast, and
   (s) at least one hydraulic return line for returning hydraulic fluid from the pressure control valve to the hydraulic reservoir.

2. A vehicle engine according to claim 1 wherein the plurality of alternators would comprise three alternators.

3. A vehicle engine according to claim 1 wherein the means for preventing hydraulic fluid from backtracking into the pair of hydraulic pumps further comprises:
   (a) a first check valve, the first check valve connected to the main hydraulic pump and the second manifold, and
   (b) a second check valve, the second check valve connected to the auxiliary hydraulic pump and the second manifold,
   (c) wherein each of the check valves would prevent fluid from backtracking into either one of the hydraulic pumps.

4. A vehicle engine according to claim 1 wherein the means for maintaining a proper hydraulic pressure within the present invention further comprises:
   (a) a plurality of accumulators attached to a hydraulic line of the present invention, each of the accumulators being designed to store hydraulic pressure and to dampen hydraulic pressure surges within the present invention, and
   (b) an overpressure relief valve attached to a hydraulic line of the present invention, the overpressure relief valve serving as a safety valve in case a buildup of hydraulic pressure occurs that is above a safe operating hydraulic pressure.

* * * * *